US011512758B2

(12) United States Patent
Lun, II et al.

(10) Patent No.: US 11,512,758 B2
(45) Date of Patent: Nov. 29, 2022

(54) BRACKET FOR ATTACHMENT WITH A HYDRAULIC DAMPER ASSEMBLY AND A METHOD OF JOINING A BRACKET AND A HYDRAULIC DAMPER ASSEMBLY

(71) Applicant: BeijingWest Industries Co., Ltd., Beijing (CN)

(72) Inventors: Saiman Lun, II, Centerville, OH (US); Steven Edward Pyle, New Lebanon, OH (US); Michael W. Hurtt, Waynesville, OH (US)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 206 days.

(21) Appl. No.: 17/089,280

(22) Filed: Nov. 4, 2020

(65) Prior Publication Data

US 2021/0131522 A1    May 6, 2021

Related U.S. Application Data

(60) Provisional application No. 62/930,404, filed on Nov. 4, 2019.

(30) Foreign Application Priority Data

Oct. 16, 2020   (CN) .......................... 202011106937.9

(51) Int. Cl.
*F16F 9/06*     (2006.01)
*F16F 9/54*     (2006.01)
(Continued)

(52) U.S. Cl.
CPC ................ *F16F 9/54* (2013.01); *F16F 9/065* (2013.01); *F16F 9/19* (2013.01); *F16F 9/3271* (2013.01);
(Continued)

(58) Field of Classification Search
CPC .. F16F 9/065; F16F 9/19; F16F 9/3271; F16F 15/023; F16F 2222/12; F16F 2226/045;
(Continued)

(56) References Cited

U.S. PATENT DOCUMENTS 2,062,290 A * 12/1936 Bott ........................ F16C 25/08
                                                              403/368
3,370,870 A *  2/1968 Mahoff ................. F16L 13/146
                                                               29/523

(Continued)

FOREIGN PATENT DOCUMENTS

EP         2738076 A1   6/2014
WO      2016022539 A1   2/2016

OTHER PUBLICATIONS

Extended European Search Report dated Mar. 30, 2021 for counterpart European patent application No. 20205408.6.

*Primary Examiner* — Thomas J Williams
*Assistant Examiner* — James K Hsiao
(74) *Attorney, Agent, or Firm* — William H. Honaker; Dickinson Wright PLLC

(57) ABSTRACT

A bracket comprises a body extending along a center axis between a first end and a second end. The body defines a first groove and a second groove. The first groove, located at the first end and flaring radially outwardly, presents a first slanted surface. The second groove, located at the second end and flaring radially outwardly, presents a second slanted surface. A pair of coupling members including a first and a second coupling member are respectively located in the first and second grooves for engagement with a housing of a hydraulic damper assembly. The first end includes at least one first deformation for retaining the first coupling member. The second end includes at least one second deformation for retaining the second coupling member. A hydraulic damper (Continued)

assembly including the bracket and a method of joining the bracket and the hydraulic damper assembly are also disclosed herein.

24 Claims, 6 Drawing Sheets

(51) Int. Cl.
F16F 9/32 (2006.01)
B60G 13/00 (2006.01)
F16F 9/19 (2006.01)
F16F 15/023 (2006.01)
F16M 13/02 (2006.01)
B60G 13/08 (2006.01)

(52) U.S. Cl.
CPC ........... *F16F 15/023* (2013.01); *F16M 13/02* (2013.01); *B60G 13/003* (2013.01); *B60G 13/08* (2013.01); *B60G 2202/24* (2013.01); *B60G 2204/128* (2013.01); *B60G 2206/82092* (2013.01); *B60G 2800/162* (2013.01); *F16F 2222/12* (2013.01); *F16F 2226/045* (2013.01); *F16F 2230/0005* (2013.01); *F16F 2232/08* (2013.01); *F16F 2234/02* (2013.01)

(58) Field of Classification Search
CPC ........... F16F 2230/0005; F16F 2232/08; F16F 2234/02; F16F 9/064; F16F 9/3235; F16F 9/54; F16F 9/43; B60G 13/003; B60G 13/08; B60G 2202/24; B60G 2204/128; B60G 2206/82092; B60G 2800/162; F16L 41/12; F15B 15/08; F15B 15/1428; F16M 13/02
USPC ............................... 188/269; 403/368, 374.1
See application file for complete search history.

(56) References Cited

U.S. PATENT DOCUMENTS

| | | | | |
|---|---|---|---|---|
| 3,751,078 A * | 8/1973 | O'Brian | .................. | F16L 21/04 285/348 |
| 3,761,116 A * | 9/1973 | Scheitlin | .................. | F16L 27/00 29/523 |
| 3,844,589 A * | 10/1974 | Bram | .................. | F16L 27/1273 285/365 |
| 3,873,138 A * | 3/1975 | Griffiths | .............. | F16L 55/1015 285/369 |
| 3,899,183 A * | 8/1975 | Wild | .................... | F16L 37/0927 285/104 |
| 3,941,410 A * | 3/1976 | Miyaoka | ................. | F16L 21/04 285/321 |
| 3,998,480 A * | 12/1976 | Twedell | .................... | F16L 5/10 285/321 |
| 4,033,613 A * | 7/1977 | Bram | .................... | F16L 37/252 285/376 |
| 4,194,769 A * | 3/1980 | Bram | .................... | F16L 27/026 285/321 |
| 4,252,347 A * | 2/1981 | Weinhold | ................ | F16L 27/04 285/263 |
| 4,460,042 A * | 7/1984 | Galle, Jr. | ................ | E21B 33/04 166/208 |
| 4,461,498 A * | 7/1984 | Kunsman | .............. | F16L 43/001 285/55 |
| 4,730,851 A * | 3/1988 | Watts | ..................... | E21B 43/10 285/317 |
| 4,858,964 A * | 8/1989 | Usui | ...................... | F16L 41/12 285/133.21 |
| 4,913,268 A * | 4/1990 | Parker | .................... | F16F 9/3235 293/134 |
| 5,004,272 A * | 4/1991 | Kipp | ..................... | E21B 33/038 285/24 |
| 5,029,904 A * | 7/1991 | Hunt | ..................... | F16L 37/133 285/924 |
| 5,207,459 A * | 5/1993 | Glover | .................... | F16L 47/24 285/23 |
| 5,246,247 A * | 9/1993 | Runkel | .............. | B60G 17/0152 280/124.159 |
| 5,314,045 A * | 5/1994 | Fenn | ....................... | F16L 41/06 188/322.21 |
| 5,375,683 A * | 12/1994 | Huang | ..................... | F16F 9/46 188/266.8 |
| 5,398,789 A * | 3/1995 | Handke | ................... | F16F 9/325 29/434 |
| 5,400,880 A * | 3/1995 | Ryan | ..................... | F16F 9/5123 280/124.157 |
| 5,430,932 A * | 7/1995 | MacLaggan | ............ | F16L 41/06 29/890.125 |
| 5,476,290 A * | 12/1995 | Bergmann | ............. | F16L 37/0845 285/322 |
| 5,480,128 A * | 1/1996 | Cotter | ...................... | F16F 9/54 188/322.19 |
| 5,524,940 A * | 6/1996 | Wartluft | ............... | F16L 37/0926 285/341 |
| 5,540,309 A * | 7/1996 | Huang | .................... | F16F 9/369 188/266.6 |
| 5,553,713 A * | 9/1996 | Sydekum | ................ | F16F 1/041 267/221 |
| 5,624,010 A * | 4/1997 | Huang | ...................... | F16F 9/46 188/282.3 |
| 5,740,890 A * | 4/1998 | Forster | .................... | F16F 9/325 188/322.13 |
| 5,823,699 A * | 10/1998 | Austin, Jr. | ............. | F16B 7/149 403/368 |
| 5,960,915 A * | 10/1999 | Nezu | ...................... | F16F 9/465 188/266.6 |
| 5,975,586 A * | 11/1999 | Pradel | ................. | F15B 15/1428 285/201 |
| 5,988,331 A * | 11/1999 | Schiffler | ................. | F16F 9/325 29/434 |
| 6,119,829 A * | 9/2000 | Nakadate | ................ | F16F 9/348 188/266.6 |
| 6,182,806 B1 | 2/2001 | Hasegawa | | |
| 6,224,114 B1 * | 5/2001 | Franzen | ................. | F16L 13/142 285/104 |
| 6,283,259 B1 * | 9/2001 | Nakadate | ................ | F16F 9/369 188/299.1 |
| 6,364,370 B1 * | 4/2002 | Honda | .................... | F16L 37/02 285/104 |
| 6,371,530 B1 | 4/2002 | Sato et al. | | |
| 6,524,032 B2 * | 2/2003 | Russell | .................... | B63B 75/00 405/251 |
| 6,648,109 B2 | 11/2003 | Farr et al. | | |
| 6,659,242 B2 * | 12/2003 | Nagai | ..................... | F16F 9/185 188/269 |
| 8,348,027 B2 | 1/2013 | Murakami | | |
| 8,469,162 B2 | 6/2013 | Nishimura et al. | | |
| 8,641,316 B2 * | 2/2014 | Betke | .................... | B62D 3/12 403/368 |
| 8,807,300 B2 * | 8/2014 | Marking | ................... | F16F 9/43 188/278 |
| 9,777,875 B2 * | 10/2017 | Bobo | .................... | F16L 37/091 |
| 9,850,976 B2 * | 12/2017 | Schmidt | .................... | F16F 9/325 |
| 2002/0011697 A1 | 1/2002 | Pesch et al. | | |
| 2002/0041795 A1 * | 4/2002 | Russell | .................... | B63B 75/00 405/195.1 |
| 2003/0160142 A1 * | 8/2003 | Brahler | ................. | F16M 11/24 248/342 |
| 2006/0283677 A1 * | 12/2006 | Schmidt | .................... | F16F 9/325 188/322.19 |
| 2009/0126808 A1 * | 5/2009 | Katsura | ................... | F16L 39/00 137/594 |
| 2011/0094833 A1 * | 4/2011 | Marking | .................. | F16F 9/062 29/446 |
| 2012/0292470 A1 * | 11/2012 | Ackermann | ............ | F16F 9/3271 248/222.11 |

(56) References Cited

U.S. PATENT DOCUMENTS

| | | | |
|---|---|---|---|
| 2013/0233790 A1* | 9/2013 | Asikainen | B07B 1/4618 |
| | | | 29/428 |
| 2013/0319807 A1* | 12/2013 | Gartner | F16F 7/1022 |
| | | | 188/378 |
| 2014/0048364 A1* | 2/2014 | Nishimura | F16F 9/325 |
| | | | 188/297 |
| 2014/0090938 A1* | 4/2014 | Nishimura | F16F 9/369 |
| | | | 188/269 |
| 2014/0109363 A1* | 4/2014 | Yang | D02G 1/12 |
| | | | 28/269 |
| 2014/0326554 A1* | 11/2014 | Marking | F16F 9/43 |
| | | | 188/269 |
| 2015/0276007 A1* | 10/2015 | Talavasek | B62K 25/20 |
| | | | 188/269 |
| 2015/0323074 A1* | 11/2015 | Ito | G01N 23/04 |
| | | | 220/582 |
| 2016/0046349 A1* | 2/2016 | Tomiuga | F16F 9/435 |
| | | | 92/61 |
| 2016/0076617 A1* | 3/2016 | Marking | F16F 9/46 |
| | | | 188/314 |
| 2017/0313151 A1 | 11/2017 | Reimann et al. | |
| 2017/0349020 A1* | 12/2017 | Kasprzyk | B60G 15/14 |
| 2017/0356518 A1* | 12/2017 | Gustafsson Vallander | |
| | | | F16F 9/5126 |
| 2018/0252290 A1* | 9/2018 | Hirao | F16F 9/53 |
| 2019/0176557 A1* | 6/2019 | Marking | F16F 9/462 |

* cited by examiner

BRACKET FOR ATTACHMENT WITH A HYDRAULIC DAMPER ASSEMBLY AND A METHOD OF JOINING A BRACKET AND A HYDRAULIC DAMPER ASSEMBLY

CROSS REFERENCE TO RELATED APPLICATION

The present application claims the benefit of U.S. Provisional Application Patent Ser. No. 62/930,404, filed on Nov. 4, 2019, and CN Application No. 202011106937.9 filed on Oct. 16, 2020, the entire disclosures of which are hereby incorporated herein by reference in their entireties.

BACKGROUND OF THE INVENTION

1. Field of the Invention

The present invention relates generally to a bracket for attachment with a hydraulic damper and a method of joining a bracket with a hydraulic damper assembly.

2. Description of the Prior Art

Outer housings of automotive shock absorbers and struts have typically comprised a plurality of mild steel stampings fastened to each other by various welding processes. The mounting brackets for such shock absorbers have also been welded to the body of the shock absorber either by fusion welding or spot welding techniques.

An important feature of shock absorbers is the ability to retain the shock absorber in its proper position notwithstanding the imposition of severe axially directed loads. During either a frontal or a rearward impact of a vehicle with either a stationary or a moving object, it has been found through repeated testing that the weakest structural members in a typical shock absorber are the welded joints. In a conventional shock absorber, the mounting bracket is typically secured to the outer cylinder of body with a welded joint.

In the event that the mounting bracket and the damper tube are made from different metals, e.g. the mounting bracket being made from aluminum and the damper tube being made from steel, the exterior surface of the damper tube includes a step feature for receiving the bracket or a retaining groove for receiving a retaining ring to allow the bracket to be mounted on the retaining ring. In order to form the step feature or the retaining groove, additional machining processes are performed after the forming the housing of the hydraulic damper assembly. Accordingly, this increases the manufacturing costs associated with the hydraulic damper assembly. In addition, due to additional machining of the housing, formation of the step feature or the retaining groove affects the overall structural integrity of the housing.

One such a hydraulic damper assembly is disclosed in U.S. Pat. No. 4,913,268. The hydraulic damper assembly includes a housing disposed on a center axis extending between an opened end and a closed end. The housing defines a chamber extending along the center axis between the opened end and the closed end. A piston is slidably disposed in the chamber dividing the chamber into a compression chamber and a rebound chamber. A piston rod extends along the center axis into the rebound chamber and couples to the piston for moving said piston in the chamber between a compression stroke and a rebound stroke. During the compression stroke, the piston rod and the piston move towards the closed end. During the rebound stroke, the piston rod and the piston move toward the opened end. A bracket couples to the housing extending annularly about the housing. The housing has an exterior surface presenting a step feature for receiving the bracket.

SUMMARY OF THE INVENTION

The present invention in its broadest aspect provides a bracket for attachment with a housing of a hydraulic damper assembly wherein additional machining or reforming of the housing of the hydraulic damper assembly are avoided and thereby, lowering the cost of manufacturing the hydraulic damper assembly. The present invention also provides a hydraulic damper assembly having a housing with improved rigidity to increase the operational life of the hydraulic damper assembly. In addition, the present invention reduces the chances of damaging the seal rings of the damper assembly. Furthermore, the present invention provides a hydraulic damper assembly including a gas cup having a reduced length and being more compact.

It is one aspect of the present invention to provide a bracket for attachment with a hydraulic damper assembly. The bracket comprises a body extending along a center axis between a first end and a second end. The body defines a first groove and a second groove. The first groove, located adjacent to and axially spaced apart from the first end, extends toward the first end flaring radially outwardly from the center axis and presenting a first slanted surface. The second groove, located adjacent to and axially spaced apart from the second end, extends toward the second end flaring radially outwardly from the center axis and presenting a second slanted surface. A pair of coupling members including a first coupling member and a second coupling member are respectively located in the first groove and the second groove for engagement with a housing of the hydraulic damper assembly. The first end includes at least one first deformation to retain the first coupling member in the first groove. The second end includes at least one second deformation to retain the second coupling member in the second groove.

It is another aspect of the present invention to provide a hydraulic damper assembly. The hydraulic damper assembly comprises a housing extending along a center axis between an opened end and a closed end. The housing defines a chamber extending between the opened end and the closed end. A piston is slidably disposed in the chamber dividing the chamber into a compression chamber and a rebound chamber. A piston rod extends along the center axis into the rebound chamber and couples to the piston for moving said piston in the chamber between a compression stroke and a rebound stroke. During the compression stroke, the piston rod and the piston move towards the closed end. During the rebound stroke, the piston rod and the piston move toward the opened end. A bracket couples to the housing extending annularly about the housing. The bracket includes a body extending about a center axis between a first end and a second end. The body defines a first groove and a second groove. The first groove, located adjacent to and axially spaced apart from the first end, extends toward the first end flaring radially outwardly from the center axis and presenting a first slanted surface. The second groove, located adjacent to and axially spaced apart from the second end, extends toward the second end flaring radially outwardly from the center axis and presenting a second slanted surface. A pair of coupling members including a first coupling member and a second coupling member are respectively located in the first groove and the second groove for engagement with a housing of the hydraulic damper assembly. The first end includes at least one first deformation to retain the first coupling member in the first groove. The second end includes at least one second deformation to retain the second coupling member in the second groove.

It is another aspect of the present invention to provide a method of joining a bracket and a housing of a hydraulic damper assembly. The method uses a tooling wherein the tooling includes a base defining a bore, a lower press ring, an upper press ring and an extension press tube. The method includes a first step of disposing the housing in the bore of the base with the housing extending outwardly from the base along a center axis. Next, the method proceeds with a step of disposing the bracket including a body extending between a first end and a second end about the housing. The method then follows with a step of securing the bracket to the housing by applying a pressure to a first end of the bracket and a second end of the bracket.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 2:
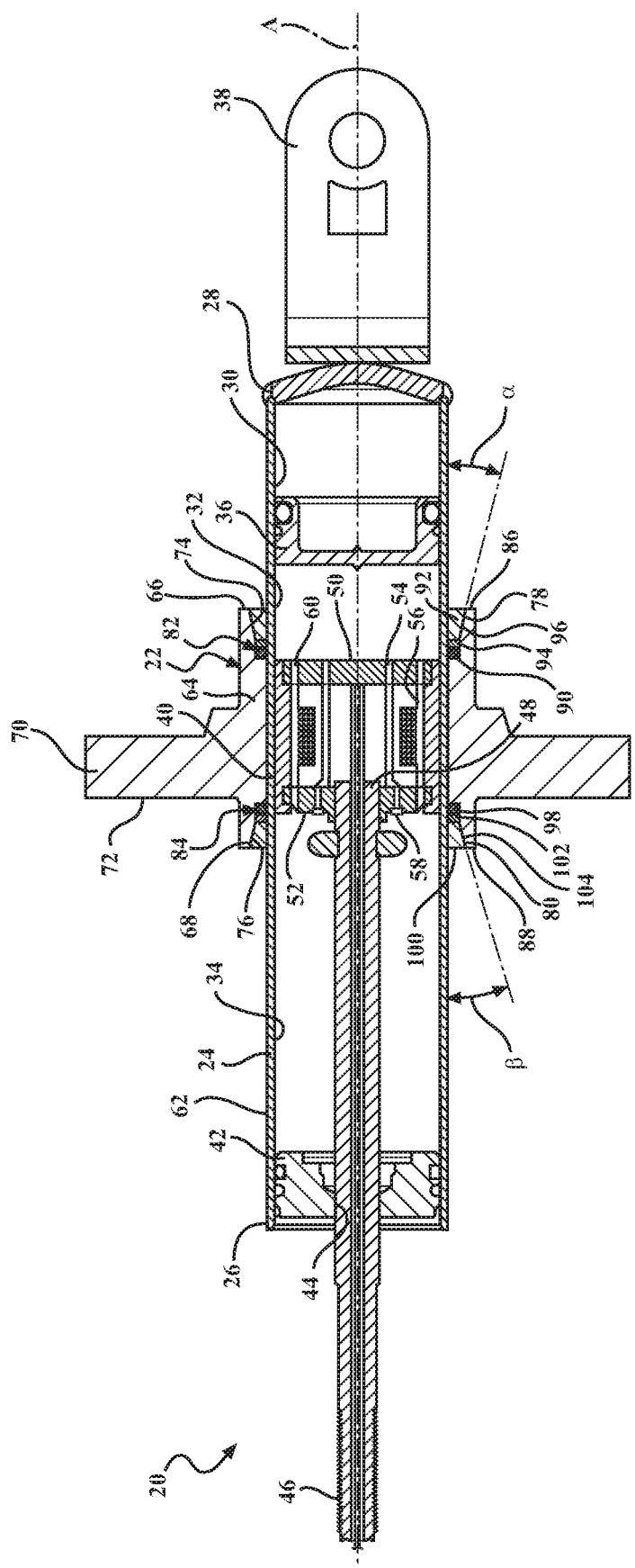
FIG. 2 is a cross-sectional perspective view of a hydraulic damper assembly including a bracket constructed in accordance with an embodiment of the present invention.

Referring to the Figures, wherein like numerals indicate corresponding parts throughout the several views, a hydraulic damper assembly 20 constructed in accordance with one embodiment of the present invention is generally shown in FIG. 2.

Figure 1A:
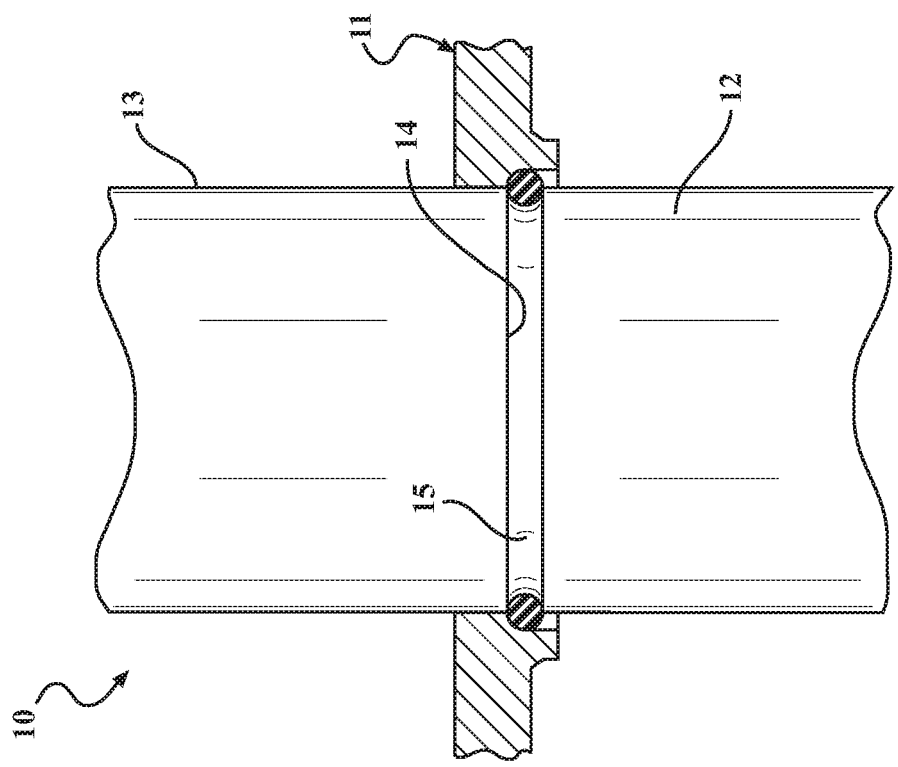
FIG. 1A is a cross-sectional perspective view of an embodiment of a hydraulic damper assembly including a bracket constructed in accordance with the prior art.
Figure 1B:
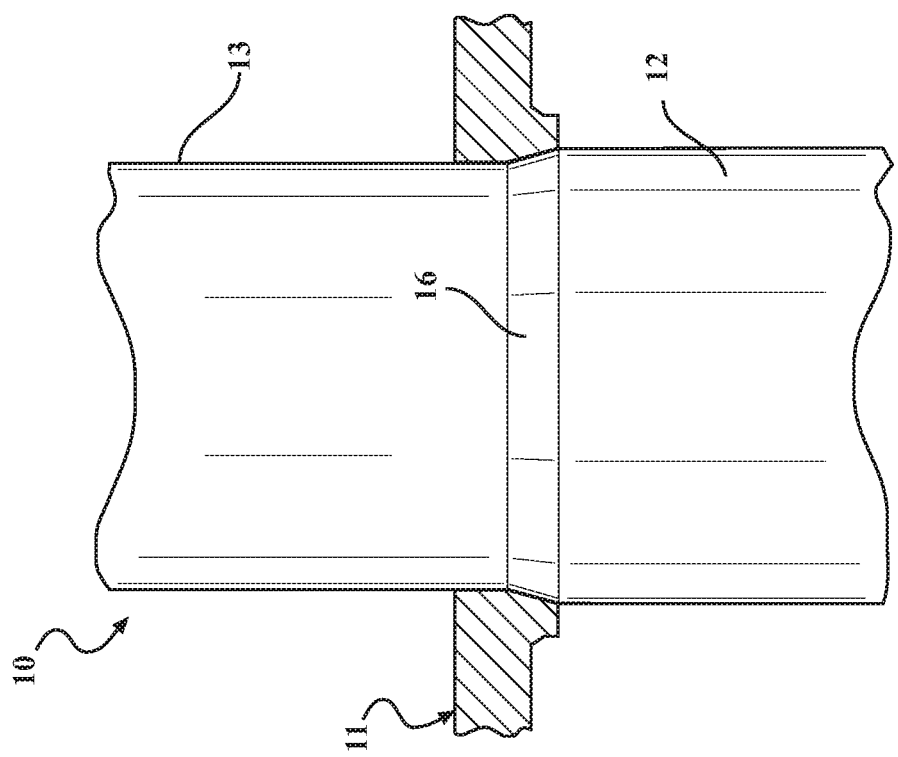
FIG. 1B is a cross-sectional perspective view of another embodiment of a hydraulic damper assembly including the bracket constructed in accordance with the prior art.

FIGS. 1A and 1B illustrate a hydraulic damper assembly 10 including a bracket 11 constructed in accordance with the prior art. As shown in FIG. 1A, the hydraulic damper assembly 10 includes a housing 12 having an exterior surface 13. The exterior surface 13 can define a retaining groove 14 for receiving a retaining ring 15. The bracket 11 is disposed over the retaining ring 15 for attachment with the housing 12 of the hydraulic damper assembly 10. FIG. 1B illustrates another embodiment of the hydraulic damper assembly 10 constructed in accordance with the prior art. As shown in FIG. 1B, the housing 12 can present a step feature 16 that increases the outer diameter of the housing 12. The bracket 11 is placed on the step feature 16 for attachment with the housing 12. In order to form the retaining groove 14 or the step feature 16 on the housing 12, additional manufacturing steps, e.g. machining or reforming, are necessary after the formation of the housing 12 which lead to an increase in the manufacturing costs associated with the hydraulic damper assembly 10. In addition, due to additional machining or reforming of the housing 12, formation of the step feature 16 or the retaining groove 14 affects the structural integrity of the housing 12.

The present invention provides a bracket 22 for attachment with a housing 24 of a hydraulic damper assembly 20 wherein the housing 24 is not subjected to any additional machining or reforming. This provides a simplified design as well as reduces the costs associated with manufacturing the hydraulic damper assembly 20. The bracket 22 and the hydraulic damper assembly 20 constructed in accordance with an embodiment of the present invention is generally shown in FIG. 2. The hydraulic damper assembly 20 comprises the housing 24, having a generally cylindrical shape, extending along a center axis A between an opened end 26 and a closed end 28. The housing 24 defines a chamber 30, 32, 34 extending along the center axis A between the opened end 26 and the closed end 28. A gas cup 36 is disposed on the center axis A, located in the chamber 30, 32, 34, and is slidable in the chamber 30, 32, 34. The gas cup 36 is axially spaced from the closed end 28 dividing the chamber 30, 32, 34 into a gas chamber 30 and a fluid chamber 32, 34. The gas chamber 30 extends between the closed end 28 and the gas cup 36. The fluid chamber 32, 34 extends between the gas cup 36 and the opened end 26. A mounting ring 38, having a generally circular shape, couples to the closed end 28 for mounting the housing 24 to a vehicle. A charge valve (not shown) couples to the housing 24 adjacent to and in fluid communication with the chamber 30, 32, 34 for introducing gas into the gas chamber 30.

A piston 40, having a generally cylindrical shape, is slidably disposed in the fluid chamber 32, 34 dividing the fluid chamber 32, 34 into a compression chamber 32 and a rebound chamber 34. The compression chamber 32 extends between the gas cup 36 and the piston 40. The rebound chamber 34 extends between the opened end 26 and the piston 40. A piston rod guide 42 is disposed in the rebound chamber 34 adjacent to the opened end 26 of the housing 24. The piston rod guide 42 is in sealing engagement with the housing 24 to close the fluid chamber 32, 34. The piston rod guide 42 defines a bore 44, having a generally cylindrical shape, extending along the center axis A and in communication with the rebound chamber 34. A piston rod 46, having a generally cylindrical shape, extends along the center axis A, through the bore 44, and into the rebound chamber 34 to a distal end 48 located in the fluid chamber 32, 34. The piston rod 46 couples to the piston 40 at the distal end 48 of the piston rod 46 for moving the piston 40 in the fluid chamber 32, 34 between a compression stroke and a rebound stroke. During the compression stroke, the piston rod 46 and the piston 40 moves towards the closed end 28. During the rebound stroke, the piston rod 46 and the piston 40 moving toward the opened end 26.

The piston 40 has a compression surface 50 and a rebound surface 52. The compression surface 50, located in the compression chamber 32, faces the closed end 28. The rebound surface 52, located in the rebound chamber 34, faces the opened end 26. The piston 40 defines a plurality of passages 54, 56 including a set of inner passages 54 and a set of outer passages 56. The inner passages 54 are disposed about the center axis A, circumferentially spaced from one another, extending between the compression surface 50 and the rebound surface 52. The outer passages 56 are disposed about the center axis A, radially spaced from the inner passages 54 and circumferentially spaced from one another, extending between the compression surface 50 and the rebound surface 52. A compression valve 58, having a plurality of discs with each of the discs having a generally circular shape, is disposed on the rebound surface 52 of the piston 40 covering the inner passages 54 for limiting working fluid flow through the piston 40 during the compression stroke to provide a damping force during the compression stroke. A rebound valve 60, having a plurality of discs with each of the discs having a generally circular shape, is disposed on the compression surface 50 of the piston 40 covering the outer passages 56 for limiting working fluid flow through the piston 40 during the rebound stroke to provide a damping force during the rebound stroke.

Figure 3:
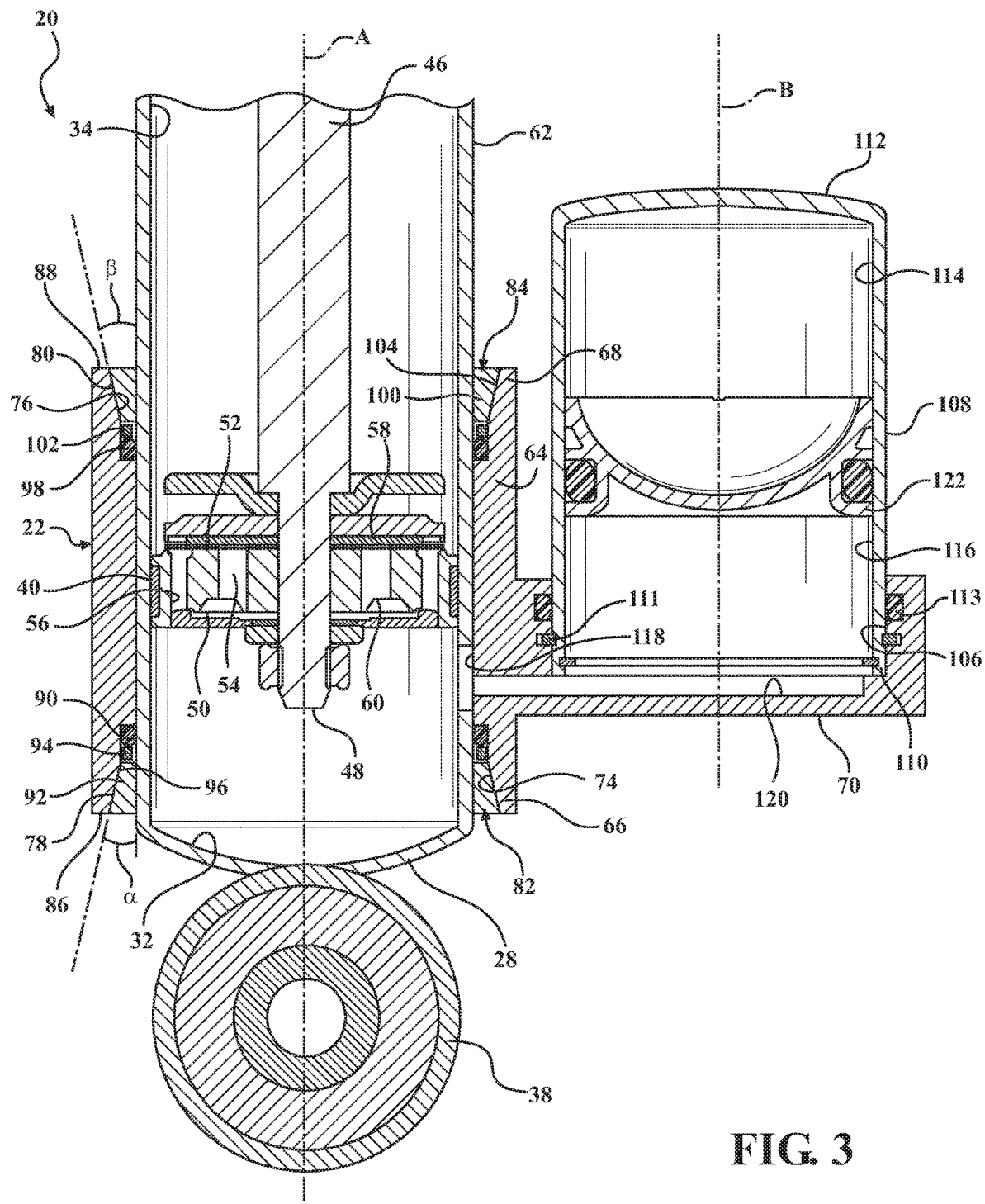
FIG. 3 is a cross-sectional fragmentary view of a hydraulic damper assembly including an external tube constructed in accordance with an embodiment of the present invention.

The bracket 22 couples to an exterior surface 62 of the housing 24 and extends annularly about the housing 24. As best illustrated in FIGS. 2-3, the bracket 22 includes a body 64, having a generally tubular shape, coupling to the housing 24 and extending along the housing 24 between a first end 66 and a second end 68. The bracket 22 includes a flange 70 extending radially outwardly from an outer surface of the body 64, annularly about the center axis A, presenting a spring seat 72 for receiving a coil spring (not shown) extending helically about the housing 24. According to one embodiment of the present invention, the bracket 22 and the housing 24 can be made from two different materials. For example, the bracket 22 can be made from a material containing aluminum while the housing 24 of the hydraulic damper assembly 20 can be made from a material containing steel. According to another embodiment of the present invention, the bracket 22 and the housing 24 can be made from the same material. For example, the bracket 22 and the housing 24 can both be made from a material containing steel.

The body 64 defines a first groove 74 and a second groove 76. The first groove 74, located adjacent to the first end 66, extends toward the first end 66 and flaring radially outwardly from the center axis A presenting a first slanted surface 78. The first slanted surface 78 extends at a first oblique angle α of less than 90° relative to the center axis A. According to an embodiment of the present invention, the first oblique angle is between 3° to 4° relative to the center axis A. The second groove 76, located adjacent to the second end 68, extends toward the second end 68 and flaring radially outwardly from the center axis A and presenting a second slanted surface 80. The second slanted surfaces 80 extend at a second oblique angle β of less than 90° relative to the center axis A. According to an embodiment of the present invention, the second oblique angle is between 3° to 4° relative to the center axis A.

A pair of coupling members 82, 84, including a first coupling member 82 and a second coupling member 84, are respectively located in the first groove 74 and the second groove 76 for engagement with the housing 24 of the hydraulic damper assembly 20. The first end 66 of the body 64 includes at least one first deformation 86 to retain the first coupling member 82 in the first groove 74. The second end 68 of the body 64 includes at least one second deformation 88 to retain the second coupling member 84 in the second groove 76. The first coupling member 82, located in the first groove 74, is in abutment relationship with the housing 24 joining the bracket 22 with the housing 24. The second coupling member 84, located in the second groove, is in abutment relationship with the housing 24 joining the bracket 22 with the housing 24.

The first coupling member 82 includes a first seal ring 90, a first wedge ring 92, and a first extrusion ring 94 arranged in a tandem relationship with one another. The first seal ring 90, having a generally cylindrical shape, is disposed in the first groove 74 extending about the housing 24 and in sealing engagement with the housing 24. The first wedge ring 92, having a trapezoidal shaped cross-section and presenting a first chamfered surface 96, is disposed in the first groove 74 whereby the first chamfered surface 96 is in an abutment relationship with the first slanted surface 78 for retaining the first seal ring 90 in the first groove 74. The first extrusion ring 94, having a rectangular shaped cross-section, is disposed in the first groove 74 between the first wedge ring 92 and the first seal ring 90 and extending about the housing 24.

The second coupling member 84 includes a second seal ring 98, a second wedge ring 100, and a second extrusion ring 102 arranged in a tandem relationship with one another. The second seal ring 100, having a generally cylindrical shape, is disposed in the second groove 76 extending about the housing 24 and in sealing engagement with the housing 24. The second coupling member 84 includes a second wedge ring 100, having a trapezoidal shaped cross-section and presenting a second chamfered surface 104, disposed in the second groove 76 whereby the second chamfered surface 104 is in an abutment relationship with the second slanted surface 80 for retaining the second seal ring 98 in the second groove 76. The second extrusion ring 102, having a rectangular shaped cross-section, is disposed in the second groove 76 between the second wedge ring 100 and the second seal ring 98 and extending about the housing 24.

By including the first coupling member 82 and the second coupling member 84, the bracket 22 can be directly fixated to the housing 24 of the hydraulic damper assembly 20. The engagement between the first wedge ring 92 and the first slanted surface 78 of the first groove 74 facilitates with the retention of the first wedge ring 92, the first seal ring 90, and the first extrusion ring 94 inside the first groove 74. Correspondingly, the engagement between the second wedge ring 100 and the second slanted surface 80 of the second groove 76 facilitates with the retention of the second wedge ring 100, the second seal ring 98, and the second extrusion ring 102 inside the second groove 76. Accordingly, additional machining or reforming of the housing 24 of the hydraulic damper assembly 20 can be avoided thereby lowering the cost of manufacturing the hydraulic damper assembly 20. In addition, avoiding additional machining or reforming of the housing 24 also improves the rigidity of the housing 24 thereby increasing the operation life of the hydraulic damper assembly 20. Furthermore, the present invention allows for any size or shape of fluid passage to be placed on the housing 24 wherein the first seal ring 90 and the second seal ring 98 do not have to be moved across these features thereby reducing the chances of damaging the first seal ring 90 and the second seal ring 98.

FIG. 3 illustrates a hydraulic damper assembly 20 constructed in accordance with another embodiment of the present invention. The hydraulic damper assembly 20 comprises the housing 24, having a generally cylindrical shape, extending along the center axis A between an opened end (not shown) and a closed end 28. The housing 24 defines a fluid chamber 32, 34 extending along the center axis A between the opened end 26 and the closed end 28. A mounting ring 38, having a generally circular shape, couples to the closed end 28 for mounting the housing 24 to a vehicle.

A piston 40, having a generally cylindrical shape, is slidably disposed in the fluid chamber 32, 34 dividing the fluid chamber 32, 34 into a compression chamber 32 and a rebound chamber 34. The compression chamber extends 32 between the closed end 28 and the piston 40. The rebound chamber 34 extends between the opened end (not shown) and the piston 40. A piston rod 46, having a generally cylindrical shape, extends along the center axis A into the rebound chamber 34 to a distal end 48 located in the fluid chamber 32, 34. The piston rod 46 couples to the piston 40 at the distal end 48 of the piston rod 46 for moving the piston 40 in the fluid chamber 32, 34 between a compression stroke and a rebound stroke. During the compression stroke, the piston rod 46 and the piston 40 moves towards the closed end 28. During the rebound stroke, the piston rod 46 and the piston 40 moving toward the opened end 26.

The piston 40 has a compression surface 50 and a rebound surface 52. The compression surface 50, located in the compression chamber 32, faces the closed end 28. The rebound surface 52, located in the rebound chamber 34, faces the opened end 26. The piston 40 defines a plurality of passages 54, 56 including a set of inner passages 54 and a set of outer passages 56. The inner passages 54 are disposed about the center axis A, circumferentially spaced from one another, extending between the compression surface 50 and the rebound surface 52. The outer passages 56 are disposed about the center axis A, radially spaced from the inner passages 54 and circumferentially spaced from one another, extending between the compression surface 50 and the rebound surface 52. A compression valve 58, having a plurality of discs with each of the discs having a generally circular shape, is disposed on the rebound surface 52 of the piston 40 covering the inner passages 54 for limiting working fluid flow through the piston 40 during the compression stroke to provide a damping force during the compression stroke. A rebound valve 60, having a plurality of discs with each of the discs having a generally circular shape, is disposed on the compression surface 50 of the piston 40 covering the outer passages 56 for limiting working fluid flow through the piston 40 during the rebound stroke to provide a damping force during the rebound stroke.

A bracket 22 couples to an exterior surface 62 of the housing 24, located adjacent to the closed end 28, extending annularly about the housing 24. The bracket 22 includes a body 64, having a generally tubular shape, coupling to the housing 24 and extending along the housing 24 between a first end 66 and a second end 68. The bracket 22 includes a flange 70 extending outwardly from an outer surface of the body 64, annularly about the center axis A.

The body 64 defines a first groove 74 and a second groove 76. The first groove 74, located adjacent to the first end 66, extends toward the first end 66 and flaring radially outwardly from the center axis A presenting a first slanted surface 78. The first slanted surface 78 extends at a first oblique angle α of less than 90° relative to the center axis A. The second groove 76, located adjacent to the second end 68, extends toward the second end 68 and flaring radially outwardly from the center axis A and presenting a second slanted surface 80. The second slanted surfaces 80 extend at a second oblique angle β of less than 90° relative to the center axis A.

A pair of coupling members 82, 84, including a first coupling member 82 and a second coupling member 84, are respectively located in the first groove 74 and the second groove 76 for engagement with the housing 24 of the hydraulic damper assembly 20. The first end 66 of the body 64 includes at least one first deformation 86 to retain the first coupling member 82 in the first groove 74. The second end 68 of the body 64 includes at least one second deformation 88 to retain the second coupling member 84 in the second groove 76. The first coupling member 82, located in the first groove 74, is in abutment relationship with the housing 24 joining the bracket 22 with the housing 24. The second coupling member 84, located in the second groove, is in abutment relationship with the housing 24 joining the bracket 22 with the housing 24.

The first coupling member 82 includes a first seal ring 90, a first wedge ring 92, and a first extrusion ring 94 arranged in a tandem relationship with one another. The first seal ring 90, having a generally cylindrical shape, is disposed in the first groove 74 extending about the housing 24 and in sealing engagement with the housing 24. The first wedge ring 92, having a trapezoidal shaped cross-section and presenting a first chamfered surface 96, is disposed in the first groove 74 whereby the first chamfered surface 96 is in an abutment relationship with the first slanted surface 78 for retaining the first seal ring 90 in the first groove 74. The first extrusion ring 94, having a rectangular shaped cross-section, is disposed in the first groove 74 between the first wedge ring 92 and the first seal ring 90 and extending about the housing 24.

The second coupling member 84 includes a second seal ring 98, a second wedge ring 100, and a second extrusion ring 102 arranged in a tandem relationship with one another. The second seal ring 100, having a generally cylindrical shape, is disposed in the second groove 76 extending about the housing 24 and in sealing engagement with the housing 24. The second coupling member 84 includes a second wedge ring 100, having a trapezoidal shaped cross-section and presenting a second chamfered surface 104, disposed in the second groove 76 whereby the second chamfered surface 104 is in an abutment relationship with the second slanted surface 80 for retaining the second seal ring 98 in the second groove 76. The second extrusion ring 102, having a rectangular shaped cross-section, is disposed in the second groove 76 between the second wedge ring 100 and the second seal ring 98 and extending about the housing 24.

The flange 70 defines a hole 106 extending along the flange 70 in a direction parallel to the center axis A for receiving an external tube 108. The external tube 108, having a generally cylindrical shape, couples to the flange 70 of the bracket 22 and in fluid communication with the fluid chamber 32, 34 of the housing 20. The external tube 108 extends along a central axis B, in a parallel relationship with the housing 20 and the center axis A, between a primary end 110 and a secondary end 112. The primary end 110, located in the hole 106, is in sealing engagement with the flange 70 via a retainer ring 111 and O-ring seal 113. The retainer ring 111 and the O-ring seal 113 are located in the hole 106 of the flange 70, spaced from one another, and in sealing engagement between the hole 106 and the external tube 108 for securing the external tube 108 to the flange 70. The retainer ring 111, having a generally rectangular cross-section and located between an inner surface of the hole 106 and the external tube 108, extends about the external tube 108. The O-ring seal 113, having a generally circular cross-section and axially spaced from the retainer ring 111, extends about the external tube 108. The secondary end 112 is axially spaced from the flange 70. The external tube 108 defines a compensation chamber 114, 116 extending between the primary end 110 and the secondary end 112 and in fluid communication with the fluid chamber 32, 34 of the housing 20. The housing 20 defines an orifice 118, located adjacent to the closed end 28 and adjacent to the bracket 22. The flange 70 defines a channel 120, located in the flange 70, extending along the flange 70 and establishing communication between the hole 106 and the orifice 118 for allowing working fluid flow from the compression chamber 32 to the compensation chamber 114, 116.

A gas cup 122, slidably disposed in the compensation chamber 114, 116, divides the compensation chamber 114, 116 into a gas chamber 114 and a liquid chamber 116. The gas chamber 114 extends between the secondary end 112 and the gas cup 122 for containing a gas to provide an additional damping force during the compression stroke. A charge valve (not shown) couples to the external tube 108 adjacent to and in fluid communication with the gas chamber 114 for introducing gas into the gas chamber 114. The liquid chamber 116 extends between the gas cup 122 and the primary end 110 and is in fluid communication with the fluid chamber 32, 34 via the channel 120 and the orifice 118. In this embodiment, instead of extending the length of the housing 24 to accommodate for the gas cup 122 and the gas chamber 114, the external tube 108 containing the gas cup 122 is located on the flange 70 of the bracket 22 and is communication with the fluid chamber 32, 34 for providing the additional damping force. This effectively reduces the length of the hydraulic damper assembly 20 allowing the hydraulic damper assembly 20 to be more compact.

Figure 4:
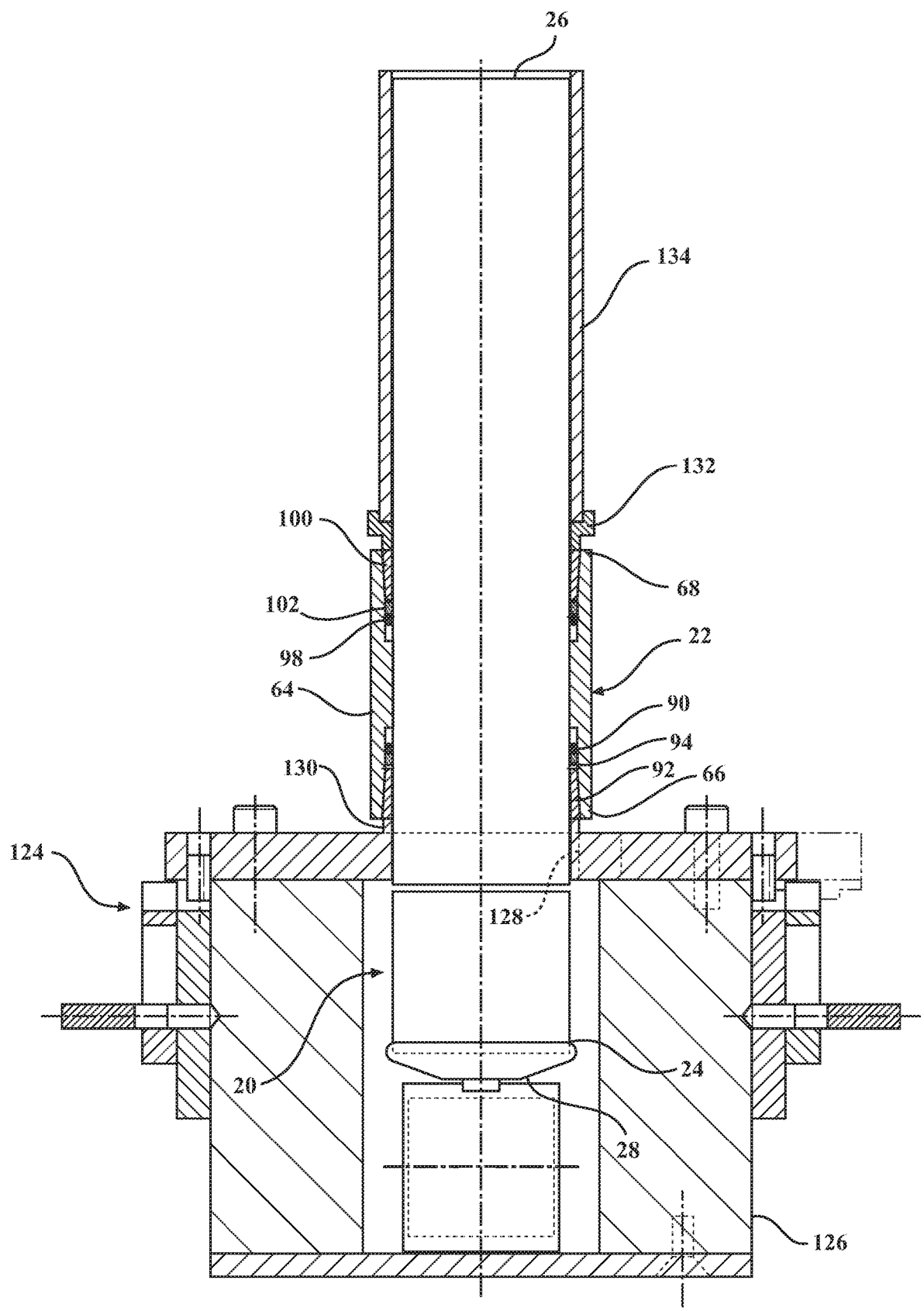
FIG. 4 is a cross-sectional perspective view of a housing of the hydraulic damper assembly and a tooling for joining the bracket and the housing of the hydraulic damper assembly.
Figure 5:
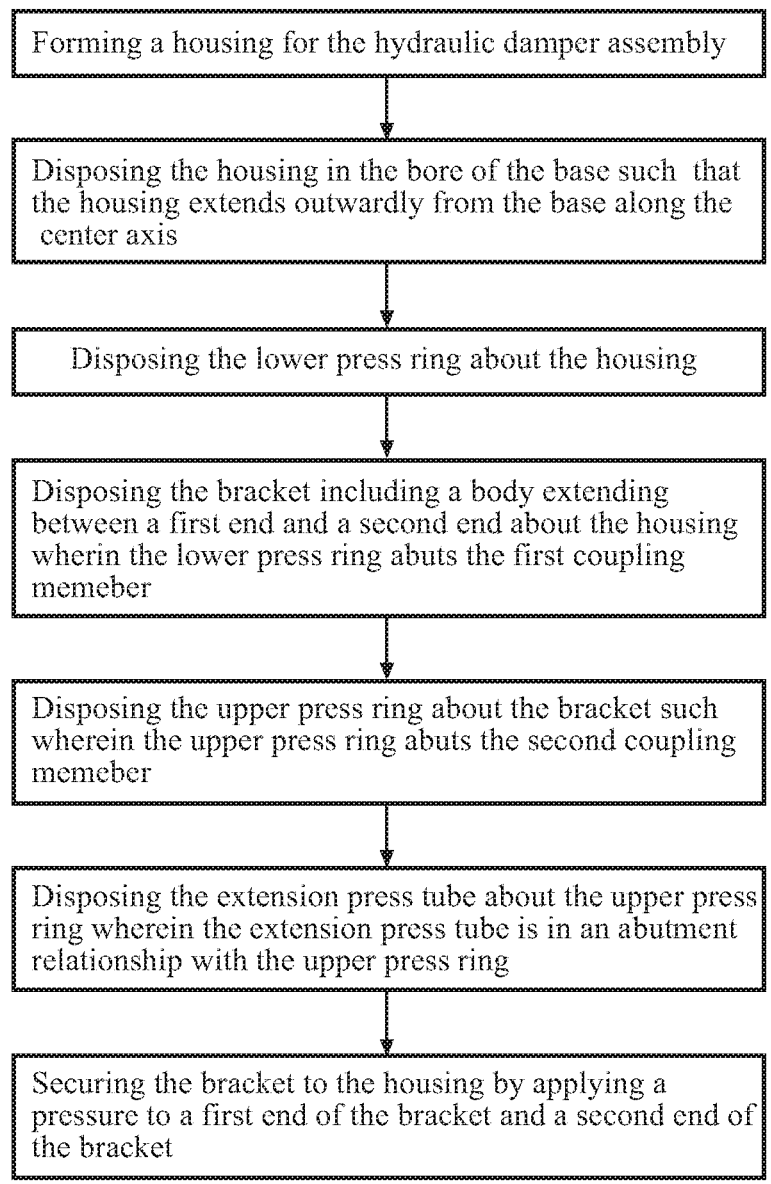
FIG. 5 is a schematic view illustrating a method of for joining the bracket and the housing of the hydraulic damper assembly.

As best illustrated in FIGS. 4 and 5, it is another aspect of the present invention to provide a method of joining a bracket 22 and a housing 24 of a hydraulic damper assembly 20. To join the bracket 22 and the housing 24, the method uses a tooling 124. As best shown in FIG. 4, the tooling 124 includes a base 126 defining a bore 128, a lower press ring 130, an upper press ring 132, and an extension press tube 134. As best illustrated in FIG. 4, the method begins with a first step of forming a housing 24 for the hydraulic damper assembly 20. The method continues with a step of disposing the housing 24 in the bore 128 of the base 126 such that the housing 24 extends outwardly from the base 126 along the center axis A. The next step of the method is disposing the bracket 22 including the body 64 extending between the first end 66 and the second end 68 about the housing 24. Prior to disposing the bracket 22 about the housing 24 and after the step of disposing the housing 24 in the bore 128, the lower press ring 130 is disposed about the housing 24 such that, once the bracket 22 is disposed about the housing 24, the lower press ring 130 abuts the first coupling member 82. After disposing the bracket 22 about the housing 24, the upper press ring 132 is disposed about the bracket 22 such that the upper press ring 132 abuts the second coupling member 84. Then, the extension press tube 134 is disposed about the upper press ring 132 wherein the extension press tube 134 is in an abutment relationship with the upper press ring 132. These steps allow the first seal ring 90 and the second seal ring 98 to be put in place without having to slide over the entire length of the housing 24.

Next, the method proceeds with a step of securing the bracket 22 to the housing 24 by applying a pressure to the first end 66 of the body 64 of the bracket 22 and the second end 68 of the body 64 of the bracket 22. To secure the bracket 22 to the housing 24, the pressure is applied, via the extension press tube 134, to the first wedge ring 92 at the first end 66 and the second wedge ring 100 located at the second end 68 to secure end of the bracket 22. By applying the pressure, the lower press ring 130 and the upper press ring 132 drive the first wedge ring 92 and the second wedge ring 100 toward one another and into the first groove 74 and the second groove 76, respectively. This allows for a frictional engagement between the first slanted surface 78 of the first groove 74 and the first chamfered surface 96 of the first wedge ring 92. This also allows for a frictional engagement between the second slanted surface 80 of the second groove 76 and the second chamfered surface 104 of the second wedge ring 100. Accordingly, due the frictional engagements, the first wedge ring 92 and the second wedge ring 100 are biased against the housing 24 by the bracket 22 to secure the bracket 22 to the housing 24. In other words, load is applied to the first wedge ring 92 and the second wedge ring 100 at the first end 66 and the second end 68 of the bracket 22 to secure the bracket 22 to the housing 24.

Figure 6:
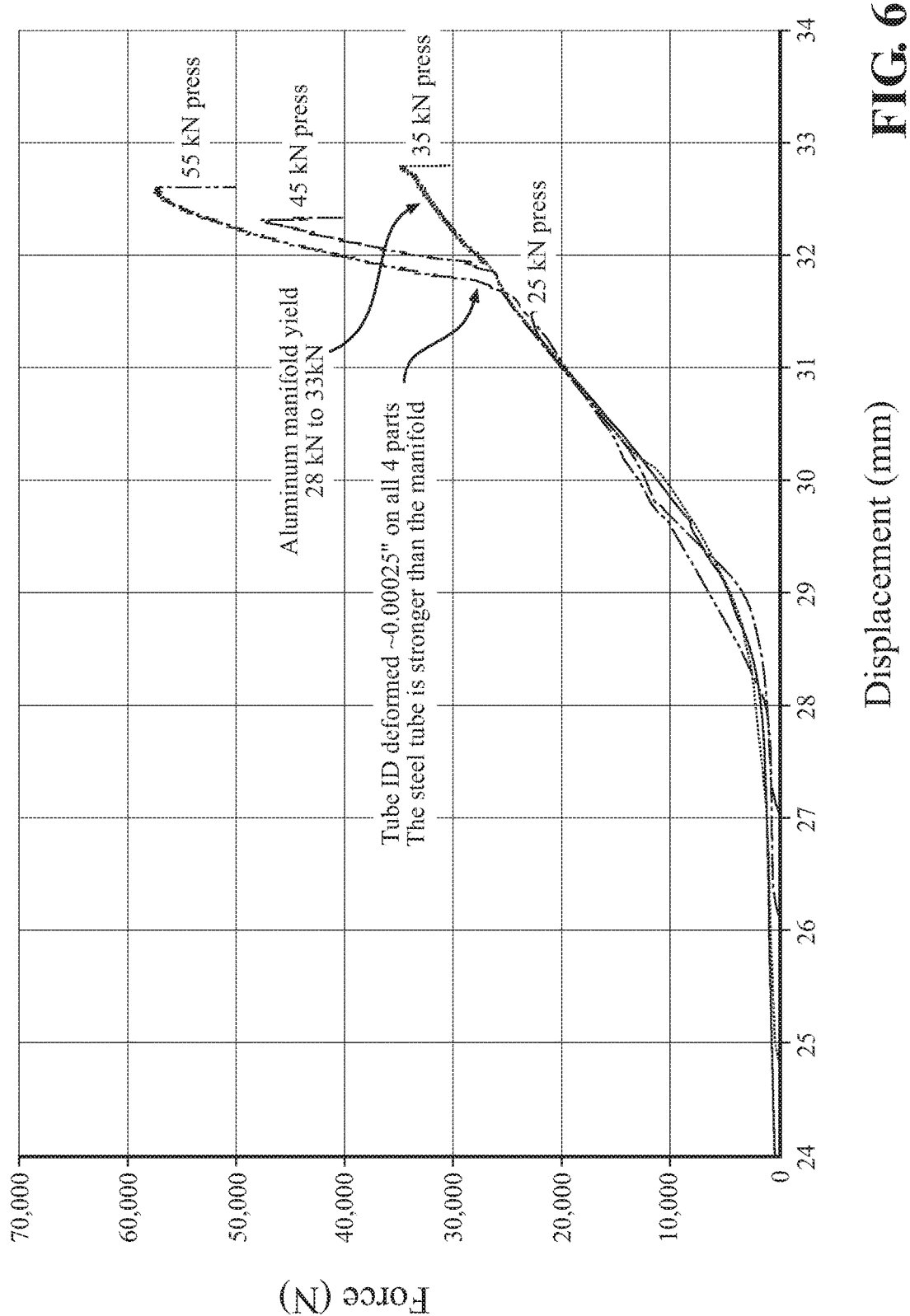
FIG. 6 is a graphical illustration of force load vs. displacement for the hydraulic damper assembly including the bracket in accordance with the present invention.

FIG. 6 provides a graphical illustration of the press force applied to the first wedge ring 92 and the second wedge ring 100 vs. the displacement of the bracket 22. As best illustrated in FIG. 6, the bracket 22, coupled to the housing 24 of the hydraulic damper assembly 20, can withstand a press force of at least 28 kN before the bracket 22 begins to displace along the housing 24. It also evident from the graphical illustration that, once the pressure or the press force exceeds 33 kN, the engagement between the bracket 22 and the housing 24 becomes negatively affect and eventually falls apart.

Obviously, many modifications and variations of the present invention are possible in light of the above teachings and may be practiced otherwise than as specifically described while within the scope of the appended claims. The use of the word "said" in the apparatus claims refers to an antecedent that is a positive recitation meant to be included in the coverage of the claims whereas the word "the" precedes a word not meant to be included in the coverage of the claims.

What is claimed is:

1. A bracket for attachment with a hydraulic damper assembly, said bracket comprising:
   a body extending along a center axis between a first end and a second end;
   said body defining a first groove and a second groove with said first groove located adjacent to said first end extending toward said first end and flaring radially outwardly from said center axis and presenting a first slanted surface and said second groove located adjacent to said second end extending toward said second end and flaring radially outwardly from said center axis and presenting a second slanted surface; and
   a pair of coupling members including a first coupling member and a second coupling member respectively located in said first groove and said second groove for engagement with a housing of the hydraulic damper assembly;
   wherein said first end includes at least one first deformation to retain said first coupling member in said first groove and said second end includes at least one second deformation to retain said second coupling member in said second groove.

2. The bracket as set forth in claim 1, wherein said first coupling member includes a first seal ring disposed in said first groove extending about said center axis.

3. The bracket as set forth in claim 2, wherein said second coupling member includes a second seal ring, having a generally cylindrical shape, disposed in said second groove extending about said center axis.

4. The bracket as set forth in claim 3, wherein said first coupling member includes a first wedge ring, presenting a first chamfered surface, disposed in said first groove whereby said first chamfered surface is in an abutment relationship with said first slanted surface.

5. The bracket as set forth in claim 4, wherein said second coupling member includes a second wedge ring, presenting a second chambered surface, disposed in said second groove whereby said second chamfered surface is in an abutment relationship with said second slanted surface.

6. The bracket as set forth in claim 5, wherein said first coupling member includes a first extrusion ring, having a rectangular shaped cross-section, disposed in said first groove between said first wedge ring and said first seal ring and extending about said center axis.

7. The bracket as set forth in claim 6, wherein said second coupling member includes a second extrusion ring, having a rectangular shaped cross-section, disposed in said second groove between said second wedge ring and said second seal ring and extending about said center axis.

8. The bracket as set forth in claim 1, wherein said bracket, coupled to said housing, withstands an axial load of between 28 kN and 33 kN.

9. A hydraulic damper assembly comprising:
a housing extending along a center axis between an opened end and a closed end defining a chamber extending between said opened end and said closed end;
a piston slidably disposed in said chamber dividing said chamber into a compression chamber and a rebound chamber;
a piston rod extending along said center axis into said rebound chamber and coupling to said piston for moving said piston in said chamber between a compression stroke and a rebound stroke with said compression stroke being defined as said piston rod and said piston moving towards said closed end and said rebound stroke being defined as said piston rod and said piston moving toward said opened end;
a bracket coupling to said housing and extending annularly about said housing;
said bracket including a body, disposed about said center axis, extending between a first end and a second end;
said body defining a first groove and a second groove with said first groove, located adjacent to said first end, extending toward said first end and flaring radially outwardly from said center axis and presenting a first slanted surface, and said second groove, located adjacent to said second end, extending toward said second end and flaring radially outwardly from said center axis and presenting a second slanted surface; and
a pair of coupling members including a first coupling member and a second coupling member respectively located in said first groove and said second groove for engagement with a housing of the hydraulic damper assembly;
wherein said first end includes at least one first deformation to retain said first coupling member in said first groove and said second end includes at least one second deformation to retain said second coupling member in said second groove.

10. The hydraulic damper assembly as set forth in claim 9, wherein said first coupling member includes a first seal ring disposed in said first groove extending about said center axis.

11. The hydraulic damper assembly as set forth in claim 10, wherein said second coupling member includes a second seal ring, having a generally cylindrical shape, disposed in said second groove extending about said center axis.

12. The hydraulic damper assembly as set forth in claim 11, wherein said first coupling member includes a first wedge ring, presenting a first chamfered surface, disposed in said first groove whereby said first chamfered surface is in an abutment relationship with said first slanted surface.

13. The hydraulic damper assembly as set forth in claim 12, wherein said second coupling member includes a second wedge ring, presenting a second chambered surface, disposed in said second groove whereby said second chamfered surface is in an abutment relationship with said second slanted surface.

14. The hydraulic damper assembly as set forth in claim 13, wherein said first coupling member includes a first extrusion ring, having a rectangular shaped cross-section, disposed in said first groove between said first wedge ring and said first seal ring and extending about said center axis.

15. The hydraulic damper assembly as set forth in claim 14, wherein said second coupling member includes a second extrusion ring, having a rectangular shaped cross-section, disposed in said second groove between said second wedge ring and said second seal ring and extending about said center axis.

16. The hydraulic damper assembly as set forth in claim 9, wherein said bracket, coupled to said housing, withstands an axial load of between 28 kN and 33 kN.

17. The hydraulic damper assembly as set forth in claim 9, wherein said bracket couples to an external surface of said housing and is adjacent to said closed end of said housing.

18. The hydraulic damper assembly as set forth in claim 17 further including a flange extending outwardly from an outer surface of said body; and
an external tube, defining a compensation chamber, coupling to said flange and in fluid communication with said chamber of said housing.

19. The hydraulic damper assembly as set forth in claim 18 wherein said flange defines a hole and a channel wherein said hole receives said external tube and said channel extends along said flange, in communication with said hole and an orifice of said housing.

20. The hydraulic damper assembly as set forth in claim 19 further including a gas cup, disposed in said compensation chamber, dividing said compensation chamber into a gas chamber and a liquid chamber with said liquid chamber being in communication with said orifice of said housing via said hole and said channel.

21. A method of joining a bracket and a housing of a hydraulic damper assembly using a tooling, the tooling including a base defining a bore, a lower press ring, an upper press ring and an extension press tube, the method comprising the steps of:
disposing the housing in the bore of the base with the housing extending outwardly from the base along a center axis;
disposing the bracket including a body extending between a first end and a second end about the housing; and
securing the bracket to the housing by applying a pressure to a first end of the bracket and a second end of the bracket.

22. The method as set forth in claim 21 wherein said body defines a first groove and a second groove with said first groove, located adjacent to said first end, extending toward said first end and flaring radially outwardly from said center axis and presenting a first slanted surface, and said second groove, located adjacent to said second end, extending toward said second end and flaring radially outwardly from said center axis and presenting a second slanted surface;
a pair of coupling members including a first coupling member and a second coupling member respectively located in said first groove and said second groove; and
the method further including the steps of:

disposing the lower press ring about the housing after said step of disposing the housing with the lower press ring abutting the first coupling member;

disposing the upper press ring about the bracket after said step of disposing the bracket with the upper press ring abutting the second coupling member.

23. The method as set forth in claim 22 wherein the first coupling member includes a first wedge ring, presenting a first chamfered surface, disposed in said first groove whereby said first chamfered surface in an abutment relationship with said first slanted surface;

wherein said second coupling member includes a second wedge ring, presenting a second chambered surface, disposed in said second groove whereby said second chamfered surface is in an abutment relationship with said second slanted surface; and wherein said step of securing the bracket is further defined as applying the pressure to the first wedge ring at the first end and the second wedge ring located at the second end to secure end of the bracket.

24. The method as set forth in claim 23 further including a step of disposing the extension press tube about the housing after said step of disposing the upper press ring with the extension press tube abutting the upper press ring; and wherein said step of securing the bracket is defined as applying the pressure using the extension press tube.

\* \* \* \* \*